US011967276B2

(12) United States Patent
Hwang et al.

(10) Patent No.: US 11,967,276 B2
(45) Date of Patent: Apr. 23, 2024

(54) DISPLAY DEVICE

(71) Applicant: Samsung Display Co., Ltd., Yongin-Si (KR)

(72) Inventors: Young In Hwang, Yongin-si (KR); Elly Gil, Yongin-si (KR); Jin A Lee, Yongin-si (KR); Joo Hyeon Jo, Yongin-si (KR); Seong Baik Chu, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 3 days.

(21) Appl. No.: 17/224,203

(22) Filed: Apr. 7, 2021

(65) Prior Publication Data

US 2021/0225284 A1 Jul. 22, 2021

Related U.S. Application Data

(62) Division of application No. 16/053,580, filed on Aug. 2, 2018, now Pat. No. 10,997,910.

(30) Foreign Application Priority Data

Nov. 14, 2017 (KR) ........................ 10-2017-0151614

(51) Int. Cl.
*G09G 3/3233* (2016.01)
*G09G 3/20* (2006.01)
(Continued)

(52) U.S. Cl.
CPC ............. *G09G 3/3233* (2013.01); *G09G 3/20* (2013.01); *G09G 3/3266* (2013.01);
(Continued)

(58) Field of Classification Search
CPC ........... G09G 2300/0426; G09G 3/006; G09G 3/3208; G09G 3/30; G09G 3/3225
See application file for complete search history.

(56) References Cited

U.S. PATENT DOCUMENTS 8,723,764 B2 5/2014 Kim
9,734,755 B2 8/2017 Lee et al.
(Continued)

FOREIGN PATENT DOCUMENTS

JP 2013190526 A * 9/2013 ............... G09G 3/20
KR 10-0570696 B1 4/2006
(Continued)

*Primary Examiner* — Yuzhen Shen
(74) *Attorney, Agent, or Firm* — Innovation Counsel LLP

(57) ABSTRACT

A display device includes: a display panel including a first pixel, a second pixel adjacent to one side of the first pixel, and a third pixel adjacent to the other side of the first pixel; a first scan driver supplying a first signal to the first to third pixels through a first scan line; a second scan driver supplying a second scan signal to the second and third pixels through a second scan line when a first time elapses after the supply of the first scan signal is started; a data driver supplying a data voltage to a plurality of output lines; and a data divider selectively supplying the data voltage to data lines respectively coupled to the first to third pixels. Each of the second and third pixels includes a switching transistor controlled by the second scan signal.

7 Claims, 13 Drawing Sheets

(51) Int. Cl.
*G09G 3/3266* (2016.01)
*G09G 3/3275* (2016.01)

(52) U.S. Cl.
CPC ... *G09G 3/3275* (2013.01); *G09G 2300/0452* (2013.01); *G09G 2310/0297* (2013.01); *G09G 2310/08* (2013.01); *G09G 2320/0233* (2013.01)

(56) References Cited

U.S. PATENT DOCUMENTS

| | | | | |
|---|---|---|---|---|
| 9,805,647 | B2 | 10/2017 | Kim | |
| 2008/0036371 | A1* | 2/2008 | Kim | G09G 3/3233 313/504 |
| 2008/0231625 | A1* | 9/2008 | Minami | G09G 3/3233 345/212 |
| 2010/0156776 | A1* | 6/2010 | Jeoung | G09G 3/3688 345/98 |
| 2012/0146999 | A1 | 6/2012 | Hwang | |
| 2013/0335395 | A1 | 12/2013 | Zhan et al. | |
| 2014/0009456 | A1* | 1/2014 | Kim | G09G 3/3208 345/82 |
| 2014/0139411 | A1 | 5/2014 | Jinta | |
| 2014/0333676 | A1 | 11/2014 | Fujii | |
| 2015/0002379 | A1 | 1/2015 | Kim | |
| 2016/0203764 | A1 | 7/2016 | In et al. | |
| 2016/0217728 | A1 | 7/2016 | In et al. | |
| 2016/0240144 | A1 | 8/2016 | Song et al. | |
| 2016/0307524 | A1 | 10/2016 | Park et al. | |
| 2016/0351124 | A1 | 12/2016 | Kim et al. | |
| 2019/0005889 | A1 | 1/2019 | Kwon et al. | |
| 2019/0130832 | A1 | 5/2019 | Chang | |

FOREIGN PATENT DOCUMENTS

| | | | |
|---|---|---|---|
| KR | 10-2010-0115062 | A | 10/2010 |
| KR | 10-2011-0080388 | A | 7/2011 |
| KR | 10-2012-0012598 | A | 2/2012 |
| KR | 10-2015-0000973 | A | 1/2015 |
| KR | 10-2016-0022969 | A | 3/2016 |

* cited by examiner

DISPLAY DEVICE

CROSS-REFERENCE TO RELATED APPLICATION

The present application is a divisional application of U.S. patent application Ser. No. 16/053,580 filed on Aug. 2, 2018, which claims priority under 35 USC § 119 to Korean patent application 10-2017-0151614 filed on Nov. 14, 2017 in the Korean Intellectual Property Office, the disclosures of which are incorporated herein in their entirety by reference.

BACKGROUND

1. Technical Field

An aspect of the present disclosure relates to a display device, and particularly, to a display device for performing internal compensation of a pixel.

2. Related Art

A display device displays an image, based on light emitted from pixels, and an organic light emitting display device includes pixels each having an organic light emitting diode. In a display device such as an organic light emitting display device, a component for compensating for a threshold voltage of a driving transistor is included in a pixel so as to prevent a display defect such as a luminance difference between pixels.

Meanwhile, an output of a data driver is controlled by a demultiplexer so as to solve a problem due to an increase in the number of lines in a display panel as the resolution of a recent display device increases. The demultiplexer may time-divide a data write time at N:1 (N is a natural number of 1 or more) so as to decrease the number of output channels (lines) of the data driver.

However, when the resolution of the display device increases, the threshold voltage compensation time of the driving transistor is remarkably decreased due to fast switching of a data signal (and the demultiplexer), and hence a compensation operation cannot be sufficiently performed. Therefore, a display defect such as a stain in a displayed image may be viewed.

SUMMARY

Embodiments provide a display device for ensuring a sufficient threshold voltage compensation time.

According to an aspect of the present disclosure, there is provided a display device including: a display panel including a first pixel, a second pixel adjacent to one side of the first pixel in a first direction, and a third pixel adjacent to the other side of the first pixel in the first direction; a first scan driver configured to supply a first signal to the first to third pixels through a first scan line; a second scan driver configured to supply a second scan signal to the second pixel and the third pixel through a second scan line when a first time elapses after the supply of the first scan signal is started; a data driver configured to supply a data voltage to a plurality of output lines; and a data divider configured to selectively supply the data voltage to data lines respectively coupled to the first to third pixels, wherein each of the second pixel and the third pixel includes a switching transistor controlled by the second scan signal.

The first scan signal may have a first width, and the second scan signal may have a second width smaller than the first width.

Gate-on periods of the first scan signal and the second scan signal may be simultaneously ended.

The data divider may selectively supply the data voltage to the data lines in response to a first selection signal for selecting a data line coupled to the first pixel and a second selection signal for selecting a data line coupled to at least one of the second pixel and the third pixel.

At least a portion of an enabling period of the first scan signal may overlap with at least a portion of an enabling period of the first selection signal and at least a portion of an enabling period of the second selection signal.

At least a portion of an enabling period of the second scan signal may overlap with at least a portion of an enabling period of the second selection signal.

The first pixel may emit green light, and each of the second pixel and the third pixel may emit one of red light and blue light.

Each of the first to third pixels may further include: a first transistor coupled between a first node electrically coupled to a first power source and a second node electrically coupled to an anode electrode of an organic light emitting diode, the first transistor generating a driving current; a second transistor coupled between one of the data lines and the first node, the second transistor receiving the first scan signal through a gate electrode thereof; a third transistor coupled between the second node and a third node coupled to a gate electrode of the first transistor, the third transistor receiving the first scan signal through a gate electrode thereof; a storage capacitor coupled between the first power source and the third node; and the organic light emitting diode coupled between the second node and a second power source.

The switching transistor may be coupled between one of the data lines and the second transistor, and receive the second scan signal through a gate electrode thereof.

Each of the first to third pixels may further include: a fourth transistor coupled between the third node and an initialization power source, the fourth transistor receiving an initialization signal through a gate electrode thereof; a fifth transistor coupled between the first power source and the first node, the fifth transistor receiving an emission control signal through a gate electrode thereof; a sixth transistor coupled between the second node and the anode electrode of the organic light emitting diode, the sixth transistor receiving the emission control signal through a gate electrode thereof; and a seventh transistor coupled between the initialization power source and the anode electrode of the organic light emitting diode, the seventh transistor receiving the first scan signal through a gate electrode thereof.

The first pixel may emit green light, and each of the second pixel and the third pixel may emit one of red light and blue light.

The turned-on time of the switching transistor may be shorter than that of the second transistor.

The switching transistor and the second transistor may be simultaneously turned off.

According to an aspect of the present disclosure, there is provided a display device including: a display panel including a first pixel, a second pixel adjacent to one side of the first pixel in a first direction, and a third pixel adjacent to the other side of the first pixel in the first direction; a first scan driver configured to supply a first signal to the first to third pixels through a first scan line; a second scan driver configured to supply a second scan signal to the second pixel through a second scan line when a first time elapses after the supply of the first scan signal is started; a third scan driver configured to supply a third scan signal to the third pixel through a third scan line after a second time elapses after the supply of the second scan signal is started; a data driver configured to supply a data voltage to a plurality of output lines; and a data divider configured to selectively supply the data voltage to data lines respectively coupled to the first to third pixels, wherein the second pixel includes a first switching transistor controlled by the second scan signal, and the third pixel includes a second switching transistor controlled by the third scan signal.

The first scan signal may have a first width, the second scan signal may have a second width smaller than the first width, and the third scan signal may have a third width smaller than the second width.

Each of the first switching transistor and the second transistor may be coupled in series to a scan transistor controlled by the first scan signal, and transfer the data voltage to the scan transistor.

The data divider may selectively supply the data voltage to the data lines, based on a first selection signal for selecting a data line coupled to the first pixel and a second selection signal for selecting a data line coupled to at least one of the second pixel and the third pixel.

At least a portion of the first scan signal may overlap with at least a portion of the first selection signal and the second selection signal, and at least a portion of the second scan signal and at least a portion of the third scan signal may overlap with at least a portion of the second selection signal.

The data divider may selectively supply the data voltage to the data lines in response to a first selection signal for selecting a data line coupled to the first pixel, a second selection signal for selecting the data line coupled to the second pixel, and a third selection signal for selecting a data line coupled to the third pixel.

At least a portion of the first scan signal may overlap with at least a portion of an enabling period of the first selection signal, the second selection signal, and the third selection signal, at least a portion of an enabling period of the second scan signal may overlap with at least a portion of an enabling period of the second selection signal and the third selection signal, and at least a portion of an enabling period of the third scan signal may overlap with at least a portion of an enabling period of the third selection signal.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
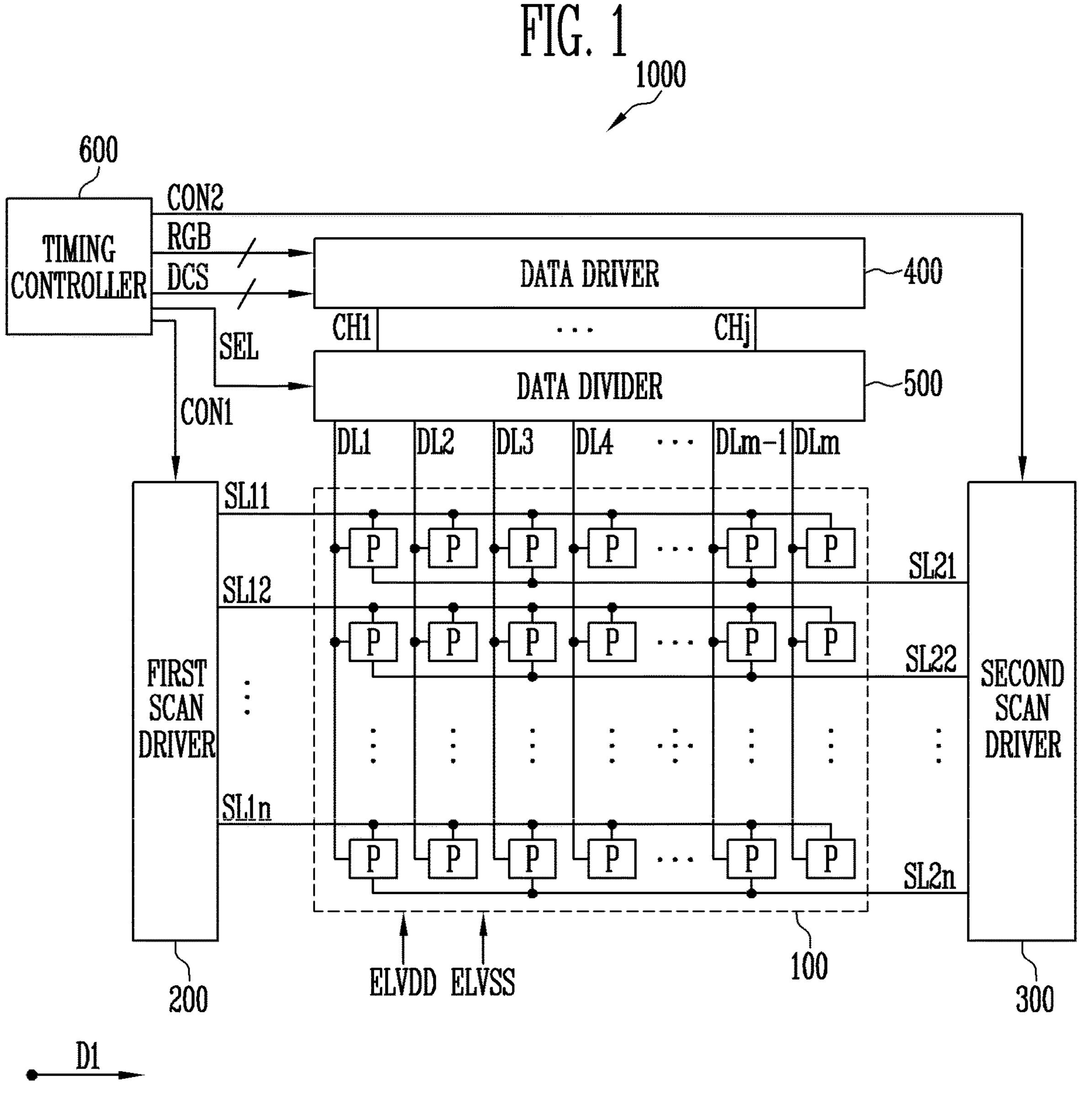
FIG. 1 is a block diagram illustrating a display device according to an embodiment of the present disclosure.

Hereinafter, exemplary embodiments of the present disclosure will be described in more detail with reference to the accompanying drawings. Throughout the drawings, the same reference numerals are given to the same elements, and their overlapping descriptions will be omitted.

FIG. 1 is a block diagram illustrating a display device according to an embodiment of the present disclosure.

Referring to FIG. 1, the display device 1000 may include a display panel 100, a first scan driver 200, a second scan driver 300, a data driver 400, a data divider 500, and a timing controller 600. In an embodiment, the display device 1000 may further include an emission driver for outputting an emission control signal.

The display device 1000 may be implemented as an organic light emitting display device, a liquid crystal display device, etc. The display device 1000 may be a flat panel display device, a flexible display device, a curved display device, a foldable display device, or a bendable display device. Also, the display device 1000 may be applied to a transparent display device, a head-mounted display device, a wearable display device, and the like.

The display panel 100 may include a plurality of first scan lines SL11 to SL1*n*, a plurality of second scan lines SL21 to SL2*n*, a plurality of data lines DL1 to DLm, and a plurality of pixels P coupled to the first scan lines SL11 to SL1*n*, the second scan lines SL21 to SL2*n*, and the data lines DL1 to DLm (here, n and m are integers greater than 1). Each of the pixels P may include a plurality of switching transistors. In an embodiment, each of the pixels P may include an organic light emitting diode, and be implemented as one of a first pixel, a second pixel, and a third pixel. For example, the first pixel may be implemented as a green pixel, and each of the second and third pixels may be implemented as one of red and blue pixels.

In an embodiment, the second pixel may be disposed adjacent to one side of the first pixel in a first direction D1, and the third pixel may be disposed adjacent to the other side of the first pixel in the first direction D1. Here, the first direction D1 may correspond to the direction of pixel rows. Specifically, the pixels P may be arranged in a pentile structure (e.g., having an arrangement of RGBG in the first direction D1) or a stripe structure (e.g., having an arrangement of RGBRGB in the first direction D1). However, this is merely illustrative, and the arrangement structure of the pixels P is not limited thereto.

In an embodiment, each of only the second and third pixels may include a switch transistor controlled by a second scan signal. The second scan signal along with a first scan signal may be a signal for controlling data voltage application timings of the first to third pixels. In an embodiment, in the pixel, the switching transistor is coupled in series to a scan transistor controlled by the first scan signal. The switching transistor may transfer a data voltage to the scan transistor, based on the second scan signal.

The first scan driver 200 may apply the first scan signal to the first scan lines SL11 to SL1*n* in response to a first control signal CON1 provided from the timing controller 600.

The second scan driver 300 may apply the second scan signal to the second scan lines SL21 to SL2*n* in response to a second control signal CON2 provided from the timing controller 600. In one pixel row, the second scan signal may be provided to only the second and third pixels when a predetermined time elapses after the supply of the first scan signal is started. That is, each of the second scan lines SL21 to SL2*n* may be coupled to only the second and third pixels in a pixel row.

In an embodiment, the first scan signal (i.e., a gate-on period of the first scan signal) may have a first width, and the second scan signal may have a second width smaller than the first width. In an embodiment, the gate-on periods of the first scan signal and the second scan signal may be simultaneously ended. Operations of pixels, which are performed by timings of the first and second scan signals, will be described in detail with reference to FIGS. 2 to 6.

The data driver 400 may apply a data signal (data voltage) to a plurality of output lines CH1 to CHj (here, j is a positive integer smaller than q) in response to a data control signal DCS and image data RGB which are provided from the timing controller 600.

The data divider 500 may selectively provide (time-divisionally supply) a data voltage to the data lines DL1 to DLm coupled to the pixels P in response to a selection control signal SEL. In an embodiment, the data divider 500 may include a plurality of demultiplexers. For example, each of the demultiplexer may transfer the data voltage to one of N data lines (here, N is an integer of 2 to 6) through N switches (e.g., metal oxide semiconductor (MOS) transistors) from one output line. That is, the display device 1000 may provide the data voltage to the first to third pixels through the demultiplexers coupled to the data lines.

The timing controller 600 may receive an RGB image signal, a vertical synchronization signal, a horizontal synchronization signal, a main clock signal, a data enable signal, and the like from an external graphic controller (not shown), and generate image data RGB corresponding to the first control signal CON1, the second control signal CON2, the data control signal DCS, and the RGB image signal, based on the received signals. The timing controller 600 may provide the first control signal CON1 to the first scan driver 200, provide the second control signal CON2 to the second scan driver 300, provide the image data RGB and the data control signal DCS to the data driver 400, and provide the selection control signal SEL to the data divider 500. The timing controller 600 may further generate a control signal for controlling the emission driver.

As described above, the display device 1000 according to the embodiment of the present disclosure includes a switching transistor controlled by the second scan signal such that a data voltage is provided to the second and third pixels after the data voltage is provided to the first pixel. Accordingly, the threshold voltage compensation time of the first pixel can be sufficiently ensured.

Figure 2:
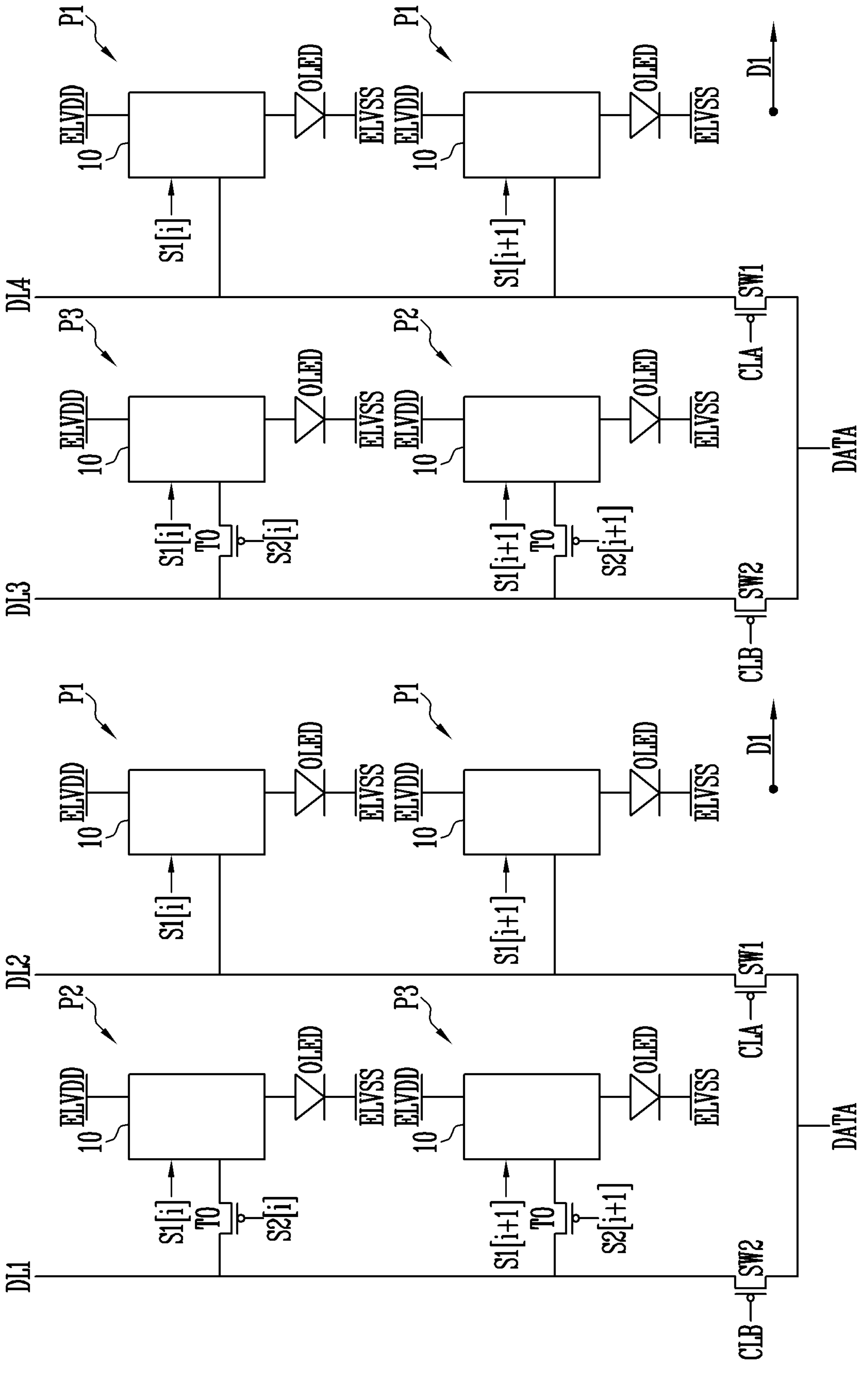
FIG. 2 is a diagram illustrating an example of a portion of a display panel included in the display device of FIG. 1.

FIG. 2 is a diagram illustrating an example of a portion of the display panel included in the display device of FIG. 1.

Referring to FIGS. 1 and 2, the pixels P may be arranged in a pentile structure in the display panel 100.

For example, a second pixel P2 may be disposed at one side of a first pixel P1 in the first direction D1, and a third pixel P3 may be disposed at the other side of the first pixel P1 in the first direction D1. In an embodiment, the first pixel P1 may emit green light, the second pixel P2 may emit red light, and the third pixel P3 may emit blue light. That is, in a pixel row, pixels may be arranged in a form in which an arrangement of RGBG is repeated.

Each of the first to third pixels P1, P2, and P3 includes a pixel circuit 10 and an organic light emitting diode OLED. The organic light emitting diode OLED may emit light with a predetermined luminance according to a driving current between a first power source ELVDD and a second power source ELVSS.

On an ith pixel row, the first to third pixels P1, P2, and P3 commonly receive a first scan signal S1[i]. The second pixel P2 (including the third pixel P3 on the ith pixel row) may include a switching transistor TO controlled by a second scan signal S2[i]. Detailed configurations and operations of the first to third pixels P1, P2, and P3 will be described with reference to FIGS. 3A to 8.

As shown in FIG. 2, the data divider 500 may include a plurality of switches SW1 and SW2 respectively coupled to the data lines DL1 and DL2, and be receive a data voltage DATA held by a latch, etc. of the data driver 400. Transistors included in the data divider 500 may be controlled by first and second selection signals CLA and CLB having a predetermined phase difference.

The data divider 500 may selectively supply the data voltage DATA to the data lines DL1 and DL2 in response to the first selection signal CLA for selecting the data line DL2 coupled to the first pixel P1 and the second selection signal CLB for selecting the data line DL1 coupled to at least one of the second pixel P2 and the third pixels P3.

For example, when the first selection signal CLA is applied (gate-on), the data voltage DATA may be provided to even numbered data lines (DL2, DL4, DL6 . . . ), and data may be written to pixels P1 coupled to the even numbered data lines (DL2, DL4, DL6 . . . ) When the second selection signal CLB is applied, the data voltage DATA may be provided to odd numbered data lines (DL1, DL3, DL5 . . . ), and data may be written to pixels P2 and P3 coupled to the odd numbered data lines (DL1, DL3, DL5 . . . ).

Figure 3A:
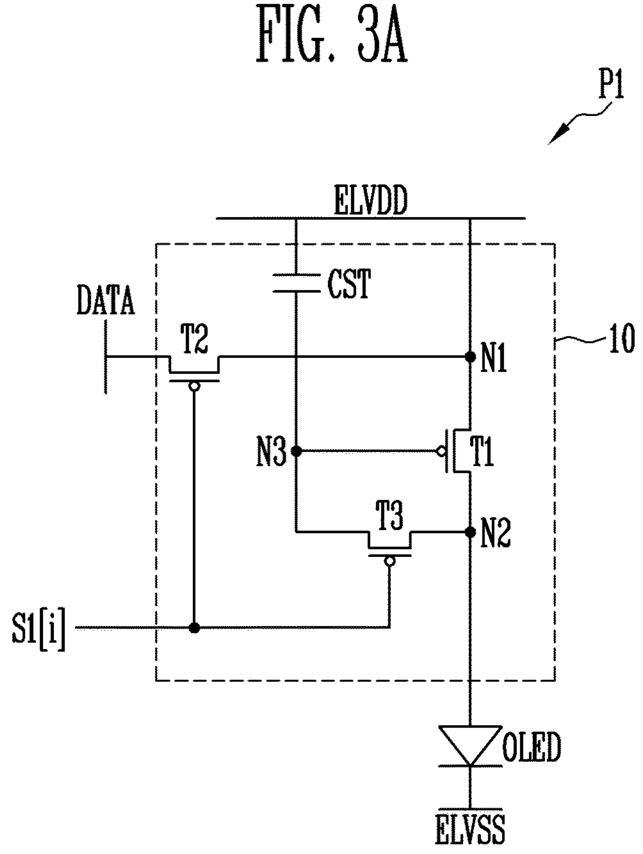
FIG. 3A is a circuit diagram illustrating an example of a second pixel included in the display panel of FIG. 2.
Figure 3B:
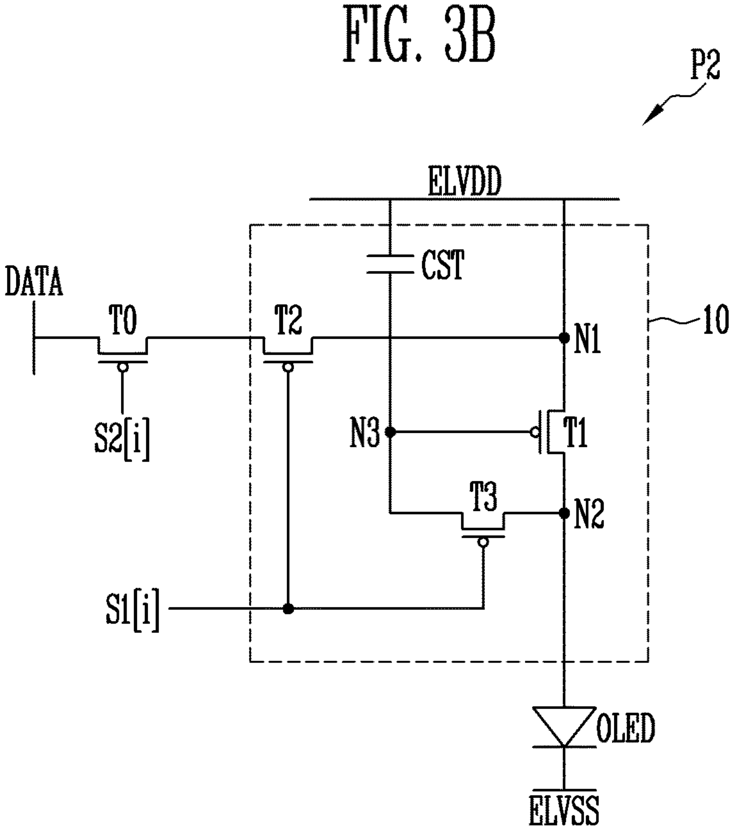
FIG. 3B is a circuit diagram illustrating an example of a first pixel included in the display panel of FIG. 2.

FIG. 3A is a circuit diagram illustrating an example of the second pixel included in the display panel of FIG. 2. FIG. 3B is a circuit diagram illustrating an example of the first pixel included in the display panel of FIG. 2.

Referring to FIGS. 3A and 3B, each of the first pixel P1 and the second pixel P2 may include a pixel circuit 10 and an organic light emitting diode OLED.

An anode electrode of the organic light emitting diode OLED may be coupled to the pixel circuit 10, and a cathode electrode of the organic light emitting diode OLED may be coupled to a second power source ELVSS. The organic light emitting diode OLED may generate light with a predetermined luminance corresponding to an amount of current supplied from the pixel circuit 10.

The pixel circuit 10 controls an amount of current flowing from a first power source ELVDD to the second power source ELVSS via the organic light emitting diode OLED, corresponding to a data voltage DATA. To this end, the pixel circuit 10 may include first to third transistors T1 to T3 and a storage capacitor Cst.

The second pixel P2 may further include a switching transistor TO. Meanwhile, the third pixel P3 may have a configuration substantially identical to that of the second pixel P2.

The first transistor T1 may be coupled between a first node N1 electrically coupled to the first power source ELVDD and a second node N2 electrically coupled to the anode electrode of the organic light emitting diode OLED. The first transistor T1 may generate a driving current and provide the generated driving current to the organic light emitting diode OLED. A gate electrode of the first transistor T1 may be coupled to a third node N3. The first transistor T1 serves as a driving transistor of the pixel.

The second transistor T2 may be coupled between a data line and the first node N1. The second transistor T2 may include a gate electrode for receiving a first scan signal S1[i]. If the second transistor T2 is turned on, the data voltage DATA may be transferred to the first node N1. That is, the second transistor T2 is a scan transistor that transfers the data voltage DATA to the pixel circuit 10 through scanning of the first scan signal S1[i].

The third transistor T3 may be coupled between the second node N2 and the third node N3. The third transistor T3 may include a gate electrode for receiving the first scan signal S1[i]. The third transistor T3 is turned on by the first scan signal S1[i], to allow a second electrode of the first transistor T1 and the third node N3 to be electrically coupled to each other. Therefore, when the third transistor T3 is turned on, the first transistor T1 may be diode-coupled. That is, the third transistor T3 may function to write the data voltage to the first transistor T1 and compensate for a threshold voltage of the first transistor T1.

The storage capacitor Cst is coupled between the first power source ELVDD and the third node N3. The storage capacitor Cst may store a voltage corresponding to the data voltage DATA and the threshold voltage of the first transistor T1.

In an embodiment, as shown in FIG. 3B, each of the second pixel P2 and the third pixel P3 (e.g., red and green pixels) may further include a switching transistor TO controlled by a second scan signal S2[i]. The switching transistor TO may be coupled to the data line and the second transistor T2. The switching transistor TO may include a gate electrode for receiving the second scan signal S2[i]. The switching transistor TO prevents a data voltage corresponding to the first pixel P1 from being unintentionally introduced into each of the second pixel P2 and the third pixel P3. Each of the second pixel P2 and the third pixel P3 performs data writing and threshold voltage compensation only when the switching transistor TO and the second transistor T2 are simultaneously turned on.

Figure 4:
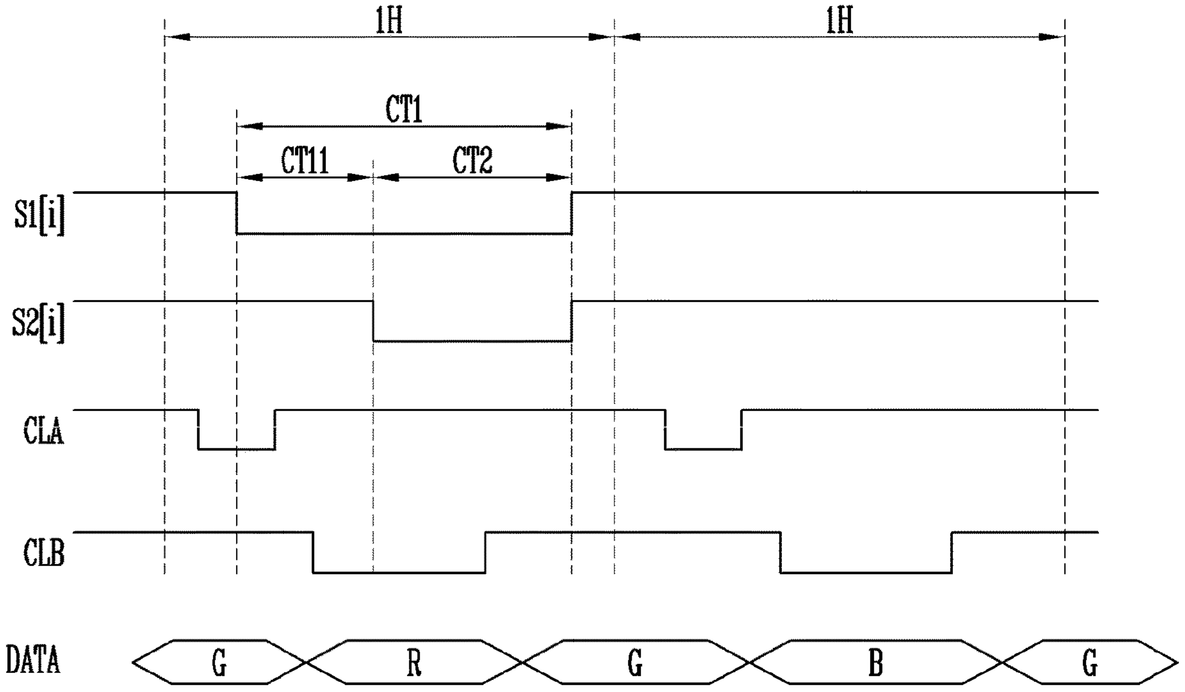
FIG. 4 is a waveform diagram illustrating an example of signals supplied to the display panel of FIG. 2.

FIG. 4 is a waveform diagram illustrating an example of signals supplied to the display panel of FIG. 2.

Referring to FIGS. 2 to 4, on an ith pixel row, a first scan signal S1[i] may be supplied, and a second scan signal S2[i] may be supplied to the second pixel P2 and the third pixel P3 through a second scan line when a first time CT11 elapses after the supply of the first scan signal S1[i] is started.

In an embodiment, the first pixel P1 may emit green light, the second pixel P2 may emit red light, and the third pixel P3 may emit blue light.

A green data voltage G may be provided to the first pixel P1 by a first selection signal CLA. That is, the data driver (400 of FIG. 1) may output a data voltage corresponding to the first pixel P1 in response to the first selection signal CLA. In other words, the green data voltage G may be supplied to the data line coupled to the first pixel P1 before the first scan signal S1[i] is applied. In an embodiment, a portion of an enabling period of the first scan signal S1[i] may overlap with at least a portion of an enabling period of the first selection signal CLA and a second selection signal CLB.

If the first scan signal S1[i] is applied, the second transistor T2 and the third transistor T3 may be turned on, so that threshold voltage compensation is performed in the first pixel P1. The threshold voltage compensation period of the first pixel P1 may correspond to a gate-on period of the first scan signal S1[i], i.e., a first width CT1.

After the supply of the first scan signal S1[i] is started (after the threshold voltage compensation period CT1 is started), a red data voltage R (or a blue data voltage B) may be provided to the second pixel P2 (or the third pixel P3) in response to the second selection signal CLB. That is, the data driver 400 may output a data voltage corresponding to the second pixel P2 or the third pixel P3, corresponding to the second selection signal CLB. In other words, the red data voltage R (or the blue data voltage B) may be supplied to the data line coupled to the second pixel P2 (or the third pixel P3) before the second scan signal S2[i] is applied. As described above, at least a portion of an enabling period of the second scan signal S2[i] may overlap with at least a portion of an enabling period of the second selection signal CLB.

If the second scan signal S2[i] is applied while the first scan signal S1[i] is being applied, the switching transistor TO may be additionally turned on, so that threshold voltage compensation is performed in the second pixel P2 and the third pixel P3. The threshold voltage compensation period of each of the second and third pixels P2 and P3 may correspond to a gate-on period of the second scan signal S2[i], i.e., a second width CT2. Here, the second scan signal S2[i] may have the second width CT2 smaller than the first width CT1.

In the conventional art, in driving of a 2:1 data line demultiplexer, threshold voltage compensation is performed on all pixels on a corresponding pixel row after the green data voltage G and the red data voltage R (or the blue data voltage B) are completely written. For this reason, the threshold voltage compensation time of the first pixel P1 applied with the green data voltage G is not sufficient, and therefore, display quality degradation such as a stain occurs.

However, according to one exemplary embodiment, the second scan signal S2[i] and the switching transistor TO are used, so that it is possible to prevent the green data voltage G from being unintentionally introduced into the second and third pixels P2 and P3 before data writing is performed on the second pixel P2 and/or the third pixel P3. Thus, the threshold voltage compensation of the first pixel P1 is possible before the data writing is performed on the second pixel P2 and/or the third pixel P3, and the threshold voltage compensation time of the first pixel (green pixel) P1 can be increased by about 1.5 times or more. In other words, the threshold voltage compensation time of the first pixel P1 can be increased by the first time CT11.

In addition, threshold voltage compensation is performed on the second and third pixels P2 and P3 in a period in which the first scan signal S1[i] and the second scan signal S2[i] overlap with each other (i.e., a period in which the switching transistor T0 and the second transistor T2 are simultaneously turned on, corresponding to the second width CT2), and thus a sufficient compensation time can be maintained.

In an embodiment, the gate-on periods of the first scan signal S1[i] and the second scan signal S2[i] may be simultaneously ended.

As described above, in the display device in which a data line demultiplexer is driven, the threshold voltage compensation time of the first pixel P1 can be increased by the first time CT11, and the threshold voltage compensation time of each of the second and third pixels P2 and P3 can be sufficiently ensured. Accordingly, an afterimage and an image quality defect caused by a stain can be considerably prevented.

Figure 5A:
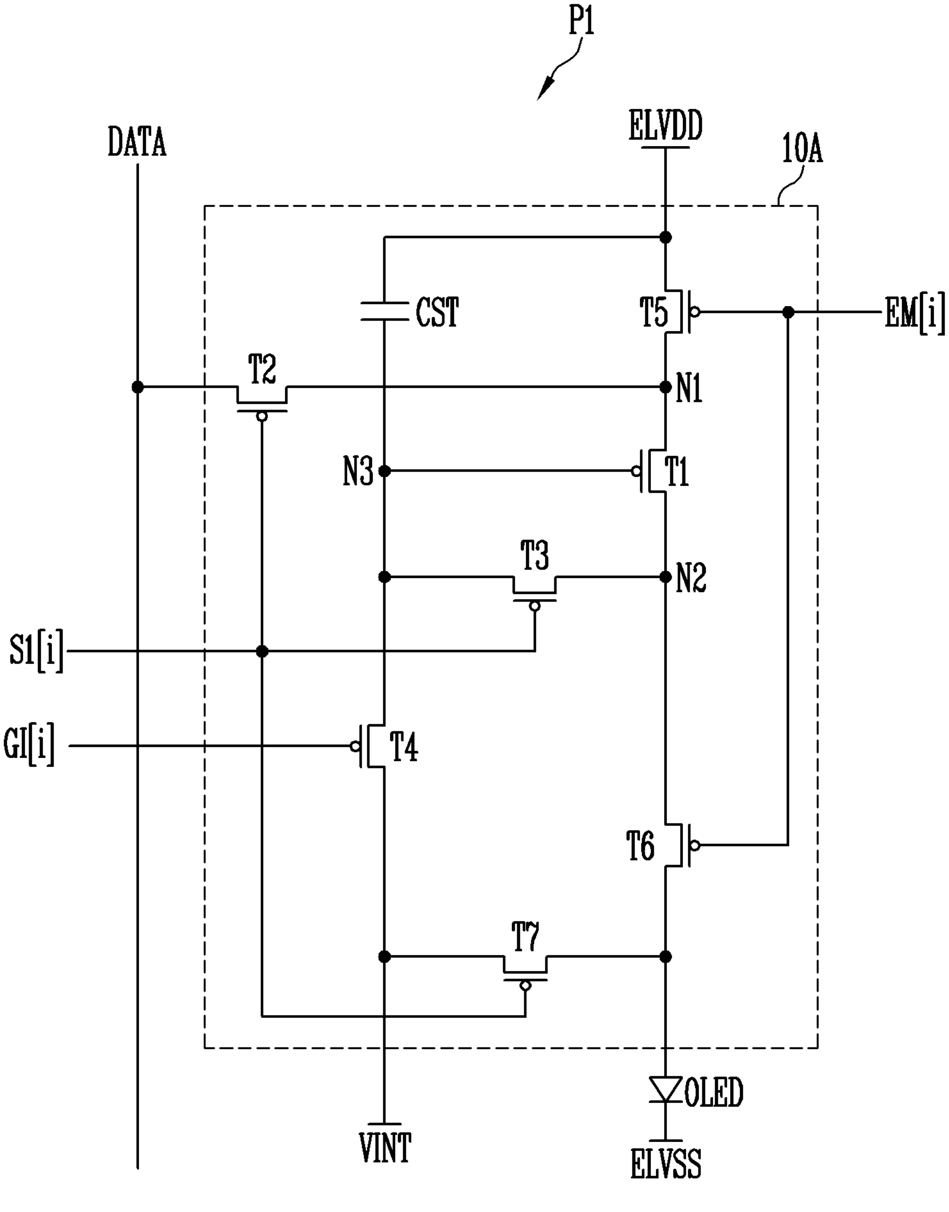
FIG. 5A is a circuit diagram illustrating an example of a second pixel included in the display panel of FIG. 2.
Figure 5B:
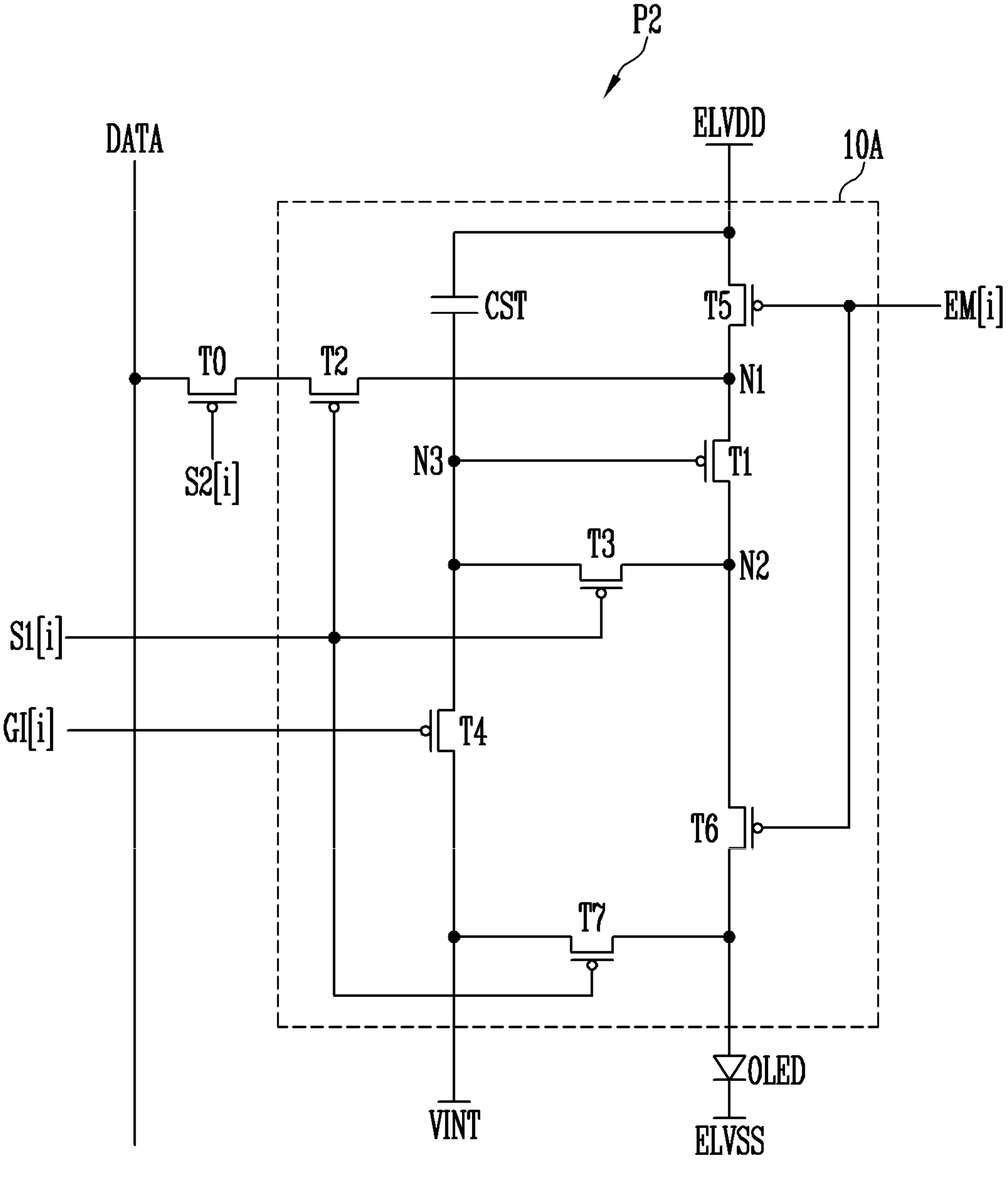
FIG. 5B is a circuit diagram illustrating an example of a first pixel included in the display panel of FIG. 2.

FIG. 5A is a circuit diagram illustrating an example of the second pixel included in the display panel of FIG. 2. FIG. 5B is a circuit diagram illustrating an example of the first pixel included in the display panel of FIG. 2.

A pixel circuit according to this embodiment is identical to an emission control driving circuit and a buffer block included therein according to FIGS. 3A and 3B, except configurations of fourth to seventh transistors. Therefore, components identical or corresponding to those of FIGS. 3A and 3B are designated by like reference numerals, and overlapping descriptions will be omitted.

Referring to FIGS. 5A and 5B, each of the first pixel P1 and the second pixel P2 may include a pixel circuit 10A and an organic light emitting diode OLED.

The pixel circuit 10A may include first to seventh transistors T1 to T7 and a storage capacitor Cst. The second pixel P2 may further include a switching transistor T0. Meanwhile, the third pixel P3 may have a configuration substantially identical to that of the second pixel P2.

The first transistor T1 serves as a driving transistor of the pixel. The second transistor T2 is a scan transistor that transfers a data voltage DATA to the pixel circuit 10A through scanning of a first scan signal S1[i]. The third transistor T3 may function to write the data voltage DATA to the first transistor T1 and compensate for a threshold voltage of the first transistor T1.

The fourth transistor T4 may be coupled between a third node N3 and an initialization power source VINT. The fourth transistor T4 may include a gate electrode for receiving an initialization signal GI[i]. In an embodiment, the initialization signal GI[i] may correspond to a first scan signal S1[i] provided to a previous pixel row. The fourth transistor T4 may be turned on when the initialization signal GI[i] is supplied, to supply the voltage of the initialization power source VINT to the third node N3. Accordingly, a voltage of the third node N3, i.e., a gate voltage of the first transistor T1 is initialized to the voltage of the initialization power source VINT. Here, the initialization power source VINT may be set to a voltage lower than the lowest voltage of the data voltage.

The fifth transistor T5 may be coupled between a first power source ELVDD and a first node N1. The fifth transistor T5 may include a gate electrode for receiving an emission control signal EM[i].

The sixth transistor T6 may be coupled between a second node N2 and an anode electrode of the organic light emitting diode OLED. The sixth transistor T6 may include a gate electrode for receiving the emission control signal EM[i].

The fifth and sixth transistors T5 and T6 may be turned on in a gate-on period of the emission control signal, and be turned off in a gate-off period of the emission control signal.

The seventh transistor T7 may be coupled between the initialization power source VINT and the anode electrode of the organic light emitting diode OLED. The seventh transistor T7 may include a gate electrode for receiving the first scan signal S1[i]. The seventh transistor T7 is turned on when the first scan signal S1[i] is supplied, to supply the voltage of the initialization power source VINT to the anode electrode of the organic light emitting diode OLED.

In an embodiment, as shown in FIG. 5B, each of the second pixel P2 and the third pixel P3 (e.g., red and green pixels) may further include a switching transistor T0 controlled by a second scan signal S2[i]. The switching transistor T0 may be coupled to a data line and the second transistor T2. The switching transistor T0 may include a gate electrode for receiving the second scan signal S2[i]. The switching transistor T0 prevents a data voltage corresponding to the first pixel P1 from being unintentionally introduced into each of the second pixel P2 and the third pixel P3. Each of the second pixel P2 and the third pixel P3 performs data writing and threshold voltage compensation only when the switching transistor T0 and the second transistor T2 are simultaneously turned on.

Figure 6:
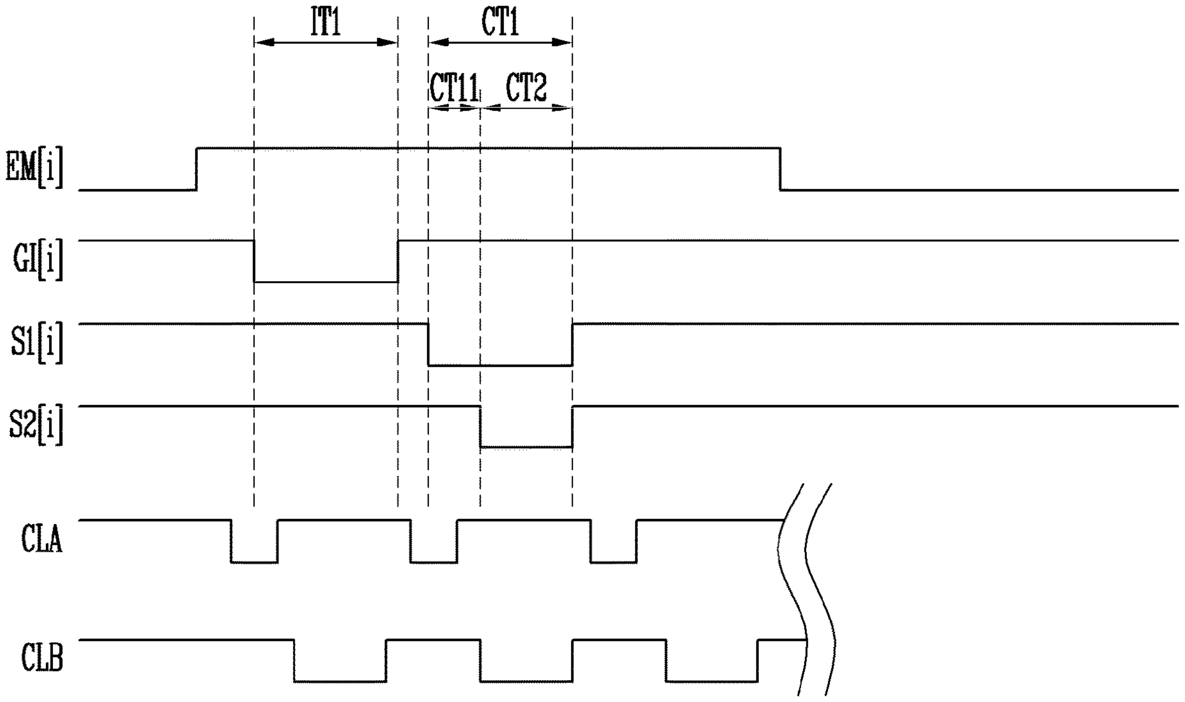
FIG. 6 is a waveform diagram illustrating an example of signals supplied to the display panel of FIG. 2.

FIG. 6 is a waveform diagram illustrating an example of signals supplied to the display panel of FIG. 2.

Driving of pixels based on signals supplied to the display panel according to this embodiment is identical to the pixel operation according to FIG. 4, except the supply of an emission control signal and an initialization signal. Therefore, components identical or corresponding to those of FIG. 4 are designated by like reference numerals, and overlapping descriptions will be omitted.

Referring to FIGS. 2, 4, and 5A to 6, in an ith pixel row, initialization, data writing, and threshold voltage compensation operations may be performed during a non-emission period in which an emission control signal EM[i] is disabled.

During an initialization period IT1, the fourth transistor T4 may be turned on by an initialization signal GI[i], to apply the voltage of the initialization power source VINT to the third node N3. In an embodiment, the initialization signal GI[i] may correspond to a first scan signal provided to a previous pixel row.

After this, a first scan signal S1[i] may be supplied after a first selection signal CLA is supplied. At least a portion of an enabling period of the first scan signal S1[i] may overlap with at least a portion of an enabling period of the first selection signal CLA and a second selection signal CLB. That is, the second selection signal CLB may be supplied after the first scan signal S1[i] is supplied. If the first scan signal S1[i] is applied, the second transistor T2 and the third transistor T3 may be turned on, so that threshold voltage compensation is performed in the first pixel P1. The threshold voltage compensation period of the first pixel P1 may correspond to a gate-on period of the first scan signal S1[i], i.e., a first width CT1.

After this, a second scan line KM may be supplied to the second pixel P2 and the third pixel P3 through a second scan line when a first time CT11 elapses after the supply of the first scan signal S1[i] is started. At least a portion of an enabling period of the second scan signal S2[i] may overlap with at least a portion of an enabling period of the second selection signal CLB. The threshold voltage compensation period of each of the second pixel P2 and the third pixel P3 may correspond to a gate-on period of the second scan signal S2[i], i.e., a second width CT2. Here, the second scan signal S2[i] may have the second width CT2 smaller than the first width CT1.

As described above, in the display device in which a data line demultiplexer is driven, the threshold voltage compensation time of the first pixel P1 can be increased by the first time CT11, and the threshold voltage compensation time of each of the second and third pixels P2 and P3 can be sufficiently ensured. Accordingly, an afterimage and an image quality defect caused by a stain can be considerably prevented.

Figure 7:
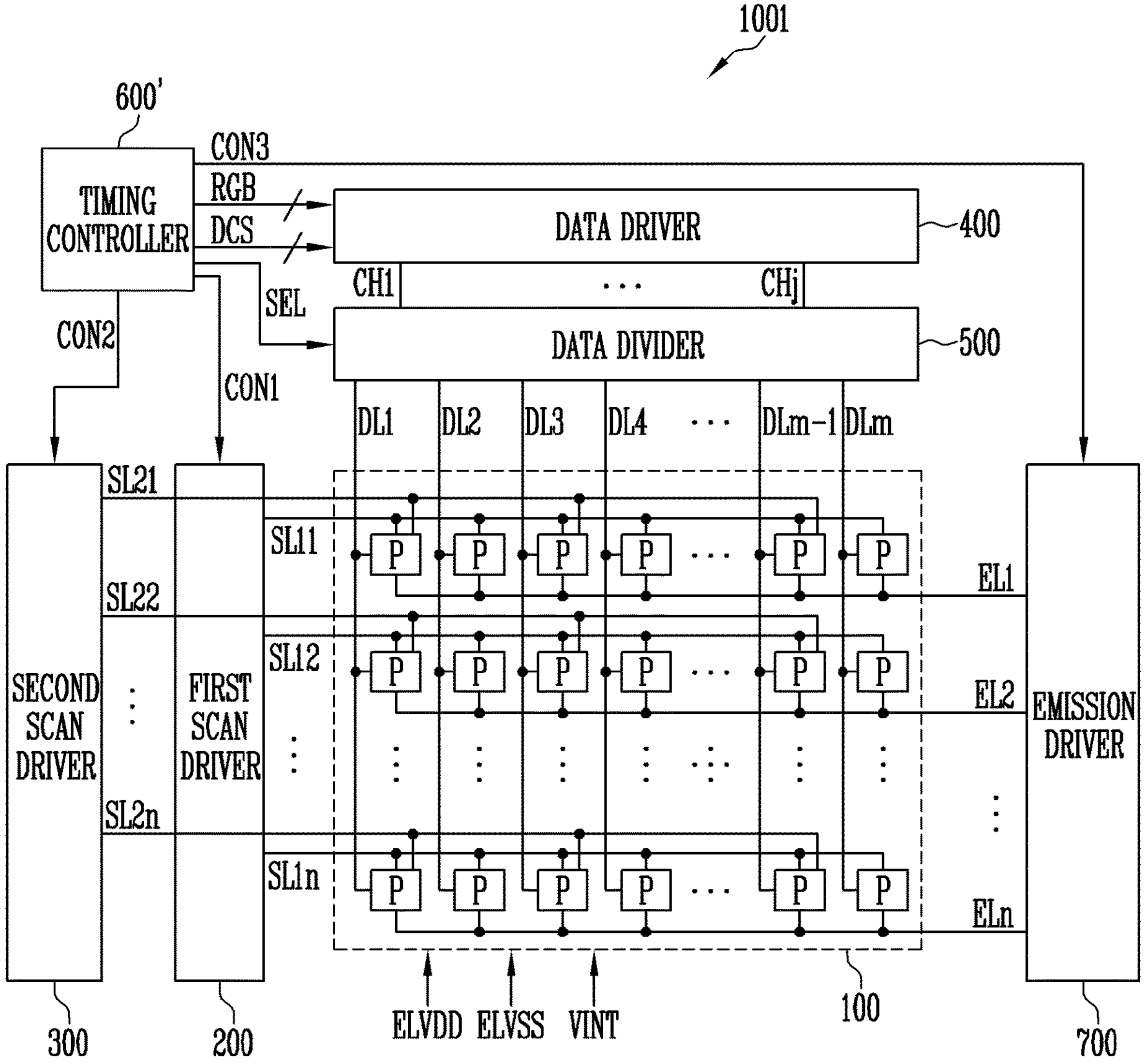
FIG. 7 is a block diagram illustrating a display device according to an embodiment of the present disclosure.

FIG. 7 is a block diagram illustrating a display device according to an embodiment of the present disclosure.

The display device according to this embodiment is identical to the display device according to FIG. 1, except the configuration of an emission driver. Therefore, components identical or corresponding to those of FIG. 1 are designated by like reference numerals, and overlapping descriptions will be omitted.

Referring to FIG. 7, the display device 1001 including the pixel circuit of the FIGS. 5A and 5B may include a display panel 100, a first scan driver 200, a second scan driver 300, a data driver 400, a data divider 500, an emission driver 700, and a timing controller 600'.

Pixels included in the display panel 100 may be implemented as the first to third pixels each including the pixel circuit 10A of FIGS. 5A and 5B.

The first scan driver 200 may apply a first scan signal to first scan lines SL11 to SL1*n* in response a first control signal CON1 provided from the timing controller 600'.

The second scan driver 300 may apply a second scan signal to second scan lines SL21 and SL2*n* in response to a second control signal CON2 provided from the timing controller 600'. In a pixel row, the second scan signal may be provided to only second and third pixels when a predetermined time elapses after the supply of the first scan signal is started. That is, each of the second scan lines SL21 to SL2*n* may be coupled to only second and third pixels in a pixel row corresponding thereto.

The emission driver 700 may apply an emission control signal to emission control lines EL1 to ELn, based on a third control signal CON3 provided from the timing controller 600'.

The timing controller 600' may generate image data RGB corresponding to the first control signal CON1, the second control signal CON2, the third control signal CON3, a data control signal DCS, and an RGB image signal.

As described above, the display device 1001 in which a data line demultiplexer is driven according to the embodiment of the present disclosure includes the pixels and the second scan driver 300 for sufficiently ensuring the threshold voltage compensation time of all of the pixels, so that an afterimage and an image quality defect caused by a stain can be considerably prevented.

Figure 8:
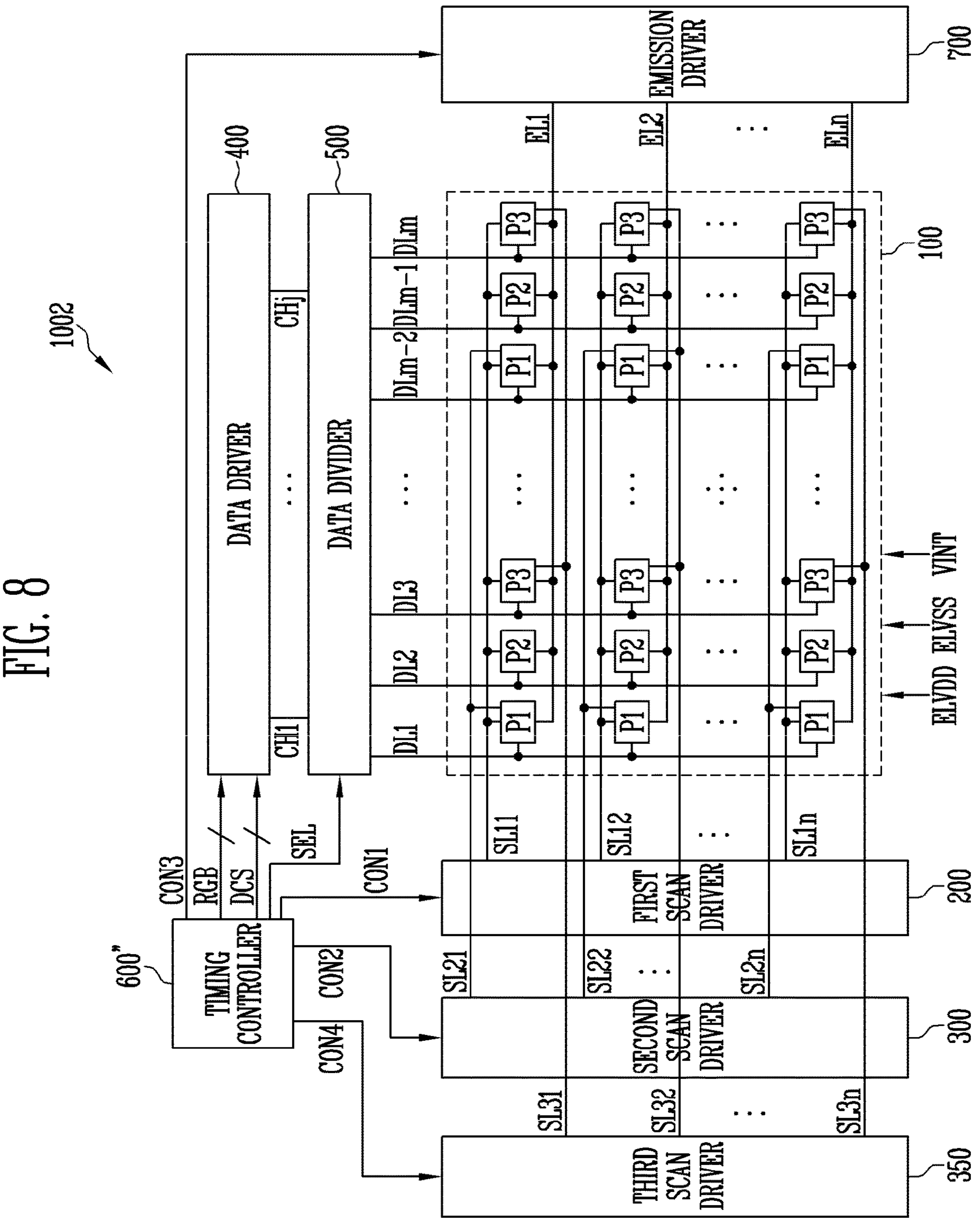
FIG. 8 is a block diagram illustrating a display device according to an embodiment of the present disclosure.

FIG. 8 is a block diagram illustrating a display device according to an embodiment of the present disclosure.

The display device according to this embodiment is identical to the display devices according to FIGS. 1 and 7, except the configuration of a third scan driver and scan lines coupled to pixels. Therefore, components identical or corresponding to those of FIGS. 1 and 7 are designated by like reference numerals, and overlapping descriptions will be omitted.

Referring to FIG. 8, the display device 1002 including the pixel circuit of FIGS. 5A and 5B may include a display panel 100, a first scan driver 200, a second scan driver 300, a third scan driver 350, a data driver 400, a data divider 500, an emission driver 700, and a timing controller 600".

Pixels included in the display panel 100 may be implemented as first to third pixels P1, P2, and P3 each including the pixel circuit 10A of FIGS. 5A and 5B. First scan lines SL11 to SL1*n*, emission control lines EL1 to ELn, and data lines DL1 to DLm may be coupled to all of the pixels P1, P2, and P3.

Second scan lines SL21 to SL2*n* may be coupled to the second pixels P2.

Third scan lines SL31 to SL3*n* may be coupled to the third pixels P3.

The first scan driver 200 may apply a first scan signal to the first scan lines SL11 to SL1*n* in response to a first control signal CON1 provided from the timing controller 600". Each of the first scan lines SL11 to SL1*n* is coupled to first to third pixels P1, P2, and P3.

The second scan driver 300 may apply a second scan signal to the second scan lines SL21 to SL2*n* in response to a second control signal CON2. In a pixel row, the second scan signal may be provided to only the second pixel P2 when a predetermined time elapses after the supply of the first scan signal is started. That is, each of the second scan lines SL21 to SL2*n* may be coupled to only the second pixel P2 in a pixel row corresponding thereto.

The emission driver 700 may apply an emission control signal to the emission control lines EL1 to ELn in response to a third control signal CON3 provided from the timing controller 600".

The third scan driver 350 may apply a third scan signal to the third scan lines S31 to S3*n* in response to a fourth control signal CON4 provided from the timing controller 600". In a pixel row, the third scan signal may be provided to only the third pixel P3 when a predetermined time elapses after the supply of the second scan signal is started. That is, each of the third scan lines SL31 to SL3*n* may be coupled to only the third pixel P3 in a pixel row corresponding thereto.

The data driver 400 may apply a data signal (data voltage) to a plurality of output lines CH1 to CHj (here, j is a positive integer smaller than q), in response to a data control signal DCS and image data RGB, which are provided from the timing controller 600". The data divider 500 may selectively provide (time-divisionally supply) a data voltage to the data lines DL1 to DLm coupled to the pixels in response to a selection control signal SEL.

The timing controller 600" may generate image data RGB corresponding to the first control signal CON1, the second control signal CON2, the third control signal CON3, the fourth control signal CON4, the data control signal DCS, and an RGB image signal.

As described above, the display device 1002 according to the embodiment of the present disclosure includes second and third scan signals for allowing voltage writing and compensation times of the first to third pixels P1, P2, and P3 to be different from one another and a switching transistor controlled by the second and third scan signals, so that the threshold voltage compensation time of the pixels can be sufficiently ensured.

Figure 9:
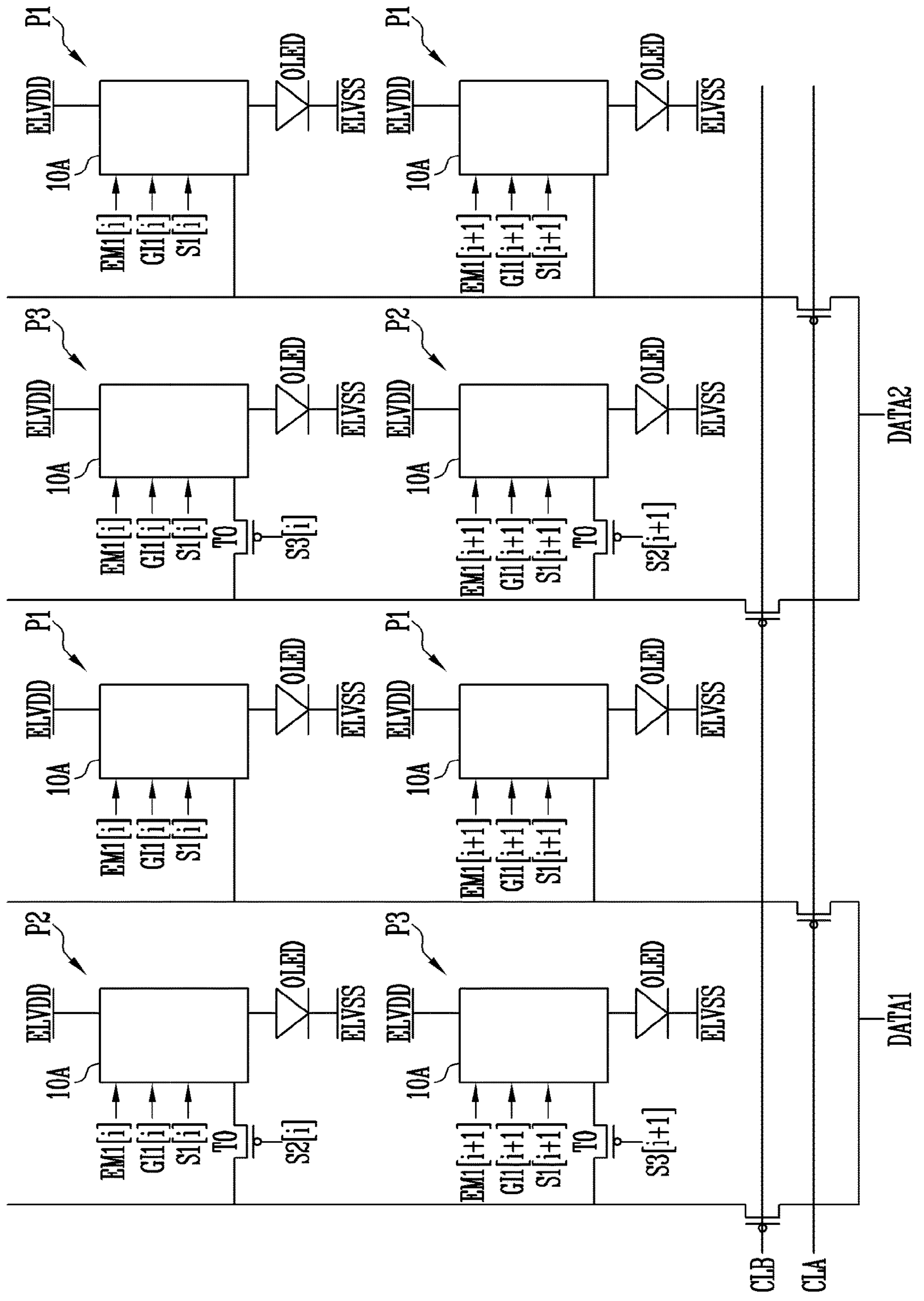
FIG. 9 is a diagram illustrating an example of a portion of a display panel included in the display device of FIG. 8.
Figure 10:
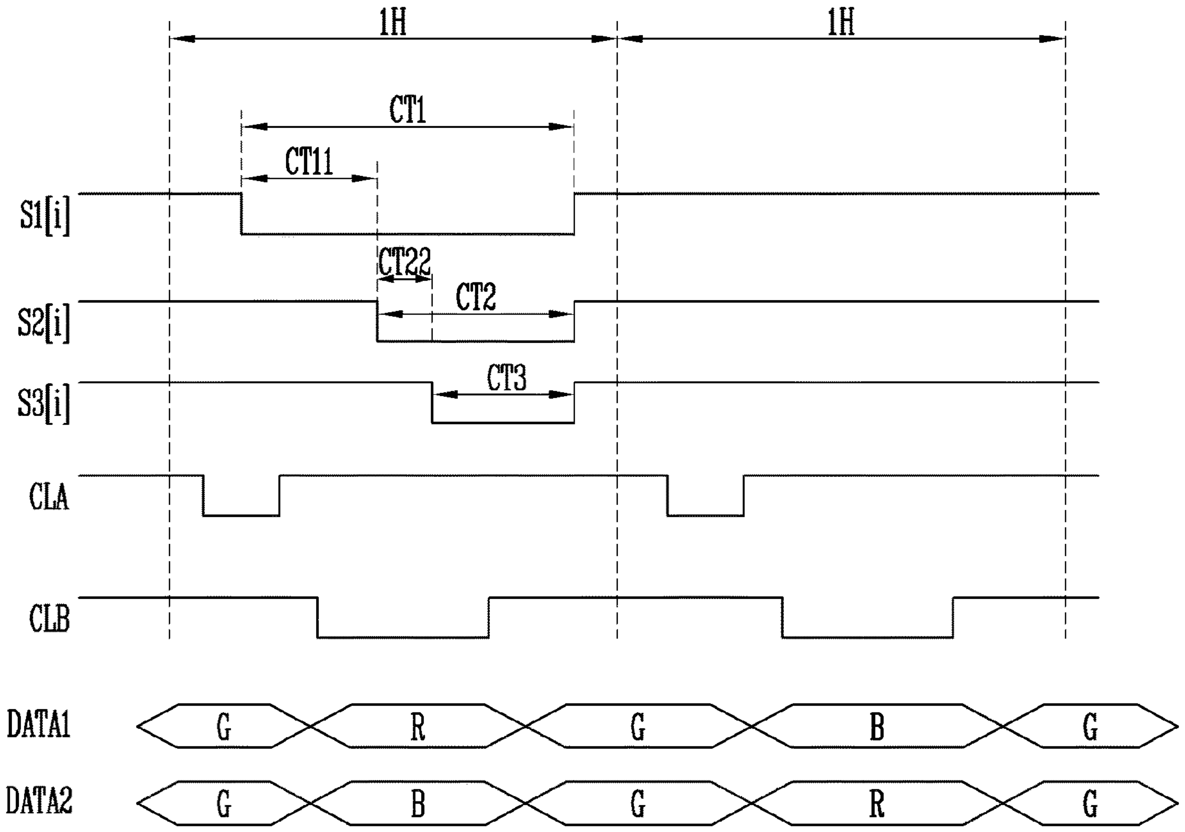
FIG. 10 is a waveform diagram illustrating an example of signals supplied to the display panel of FIG. 9.

FIG. 9 is a diagram illustrating an example of a portion of the display panel included in the display device of FIG. 8. FIG. 10 is a waveform diagram illustrating an example of signals supplied to the display panel of FIG. 9.

The display panel and driving thereof according to FIGS. 9 and 10 are identical to those according to FIGS. 2 and 4, except a third scan signal applied to the third pixel is different from a second scan signal applied to the second pixel. Therefore, components identical or corresponding to those of FIGS. 2 and 4 are designated by like reference numerals, and overlapping descriptions will be omitted.

Referring to FIGS. 9 and 10, the pixels P1, P2, and P3 in the display panel 100 may be arranged in a pentile structure. In an embodiment, the first pixel P1 may emit green light, the second pixel P2 may emit red light, and the third pixel P3 may emit blue light. That is, in a pixel row, pixels P1 may be arranged in a form in which an arrangement of RGBG is repeated.

In an ith pixel row, the first to third pixels P1, P2, and P3 commonly receive a first scan signal S1[i]. The second pixel P2 may include a switching transistor T0 controlled by a second scan signal S2[i]. The third pixel P3 may include a switching transistor T0 controlled by a third scan signal S3[i]. In an embodiment, the first scan signal S1[i] may have a first width CT1, the second scan signal S2[i] may have a second width CT2 smaller than the first width CT1, and the third scan signal S3[i] may have a third width CT3 smaller than the second width CT2.

In an embodiment, the second scan signal S2[i] may be supplied to the second pixel P2 when a first time CT11 elapses after the supply of the first scan signal S1[i] is started, and the third scan signal S3[i] may be supplied to the third pixel P3 when a second time CT22 elapses after the supply of the second scan signal S2[i] is started.

The data divider 500 may selectively supplies data voltages DATA1 and DATA2 to data lines DL1 and DL2 in response to a first selection signal CLA for selecting the data line DL2 coupled to the first pixel P1 and a second selection signal CLB for selecting the data line DL1 coupled to at least one of the second pixel P2 and the third pixel P3. Here, the data voltages DATA1 and DATA2 may be output from driving circuits different from each other. Therefore, as shown in FIG. 10, a red data voltage and a blue data voltage may be simultaneously supplied to data lines in a pixel row. However, the threshold voltage compensation time of the second pixel P2 and the threshold voltage compensation time of the third pixel P3 may be different from each other due to the difference between the width CT2 of the second scan signal S2[i] and the width CT3 of the third scan signal S3[i].

A green data voltage G may be supplied to the data line coupled to the first pixel P1 by the first selection signal CLA. After this, if the first scan signal S1[i] is applied, the second transistor T2 and the third transistor T3 may be turned on, so that threshold voltage compensation is performed in the first pixel P1. The threshold voltage compensation period of the first pixel P1 may correspond to a gate-on period of the first scan signal S1[i], i.e., the first width CT1.

During the threshold voltage compensation period of the first pixel P1, a red data voltage R may be supplied to the data line coupled to the second pixel P2 by the second selection signal CLB, and a blue data voltage B may be supplied to the data line coupled to the third pixel P3 by the second selection signal CLB. After this, if the second scan signal S2[i] is applied, the switching transistor T0 of the second pixel P2 may be turned on, so that threshold voltage compensation is performed in the second pixel P2. The threshold voltage compensation period of the second pixel P2 may correspond to a gate-on period of the second scan signal S2[i], i.e., the second width CT2.

If the third scan signal S3[i] is applied during the threshold voltage compensation period of the second pixel P2, the switching transistor T0 of the third pixel P3 may be turned on, so that threshold voltage compensation is performed in the third pixel P3. The threshold voltage compensation period of the third pixel P3 may correspond to a gate-on period of the third scan signal S3[i], i.e., the third width CT3.

Accordingly, the threshold voltage compensation time of the first pixel (green pixel) P1 can be increased by the first time CT11, and the threshold voltage compensation time of the second pixel (red or blue pixel) P2 may be increased by the second time CT22. Further, the width, interval, etc. of each of the second scan signal S2[i] and the third scan signal S3[i] is controlled, so that the threshold voltage compensation time of each of the second pixel P2 and the third pixel P3 can be freely controlled.

Figure 11:
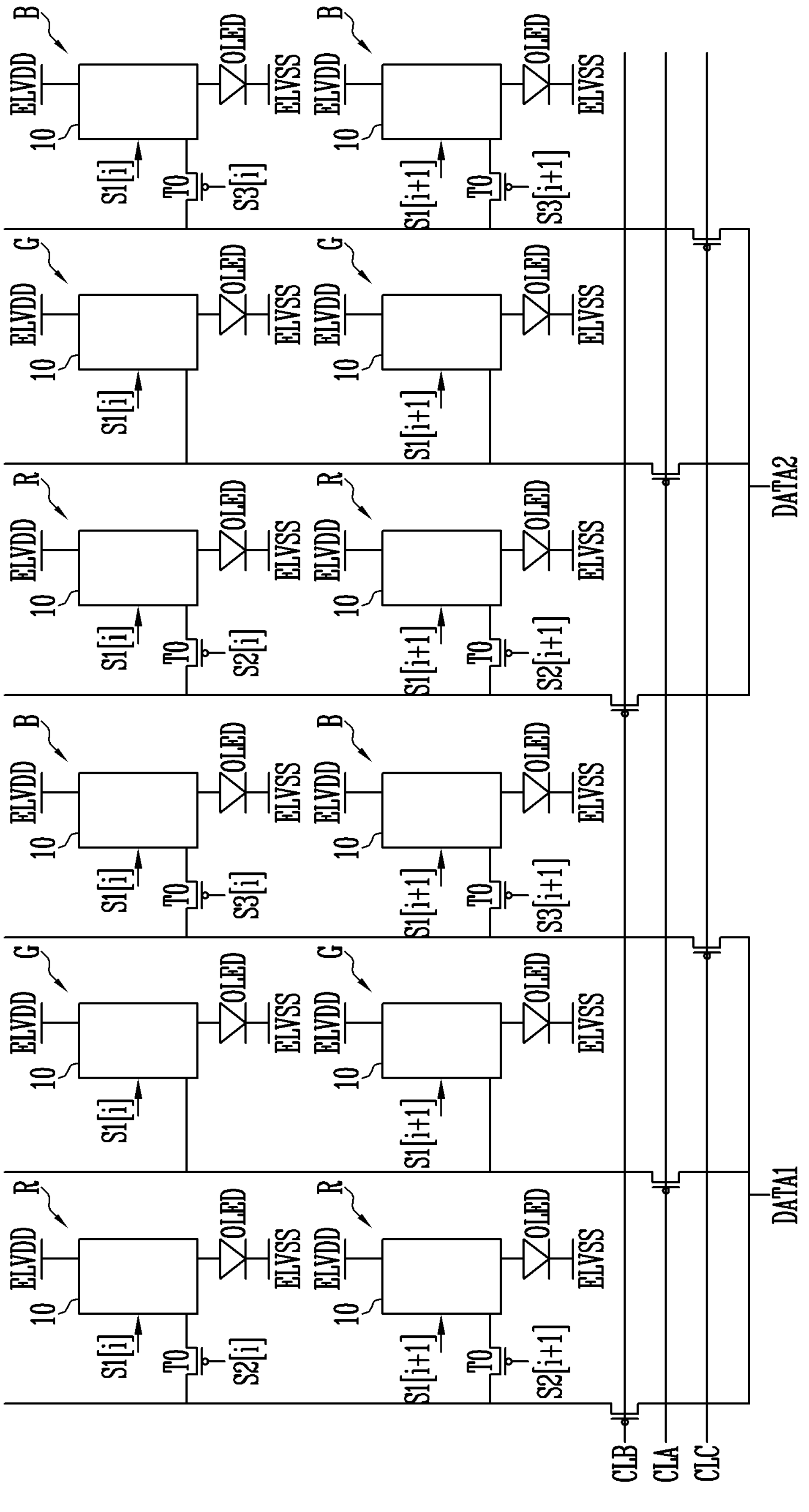
FIG. 11 is a diagram illustrating an example of a portion of a display panel included in the display device of FIG. 8.
Figure 12:
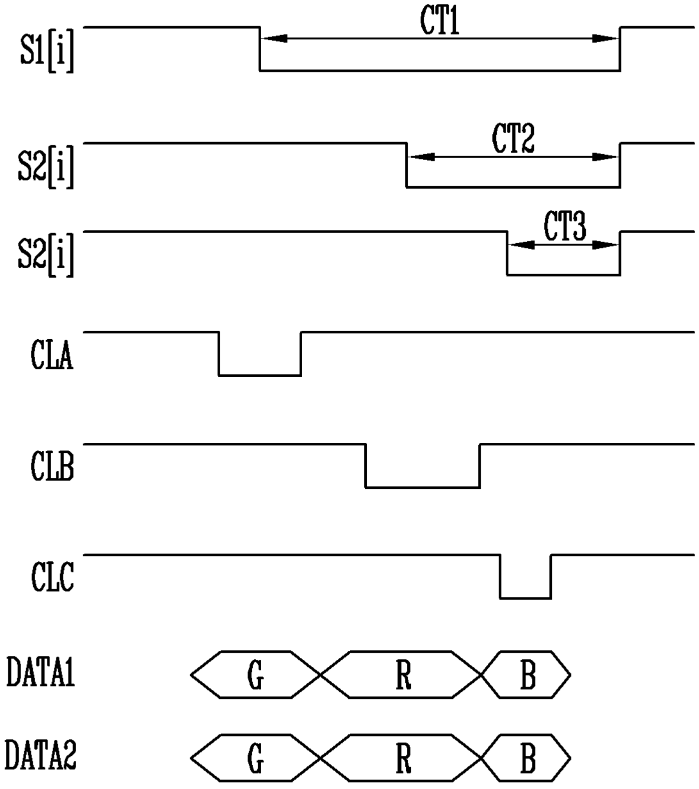
FIG. 12 is a waveform diagram illustrating an example of signals supplied to the display panel of FIG. 11.

FIG. 11 is a diagram illustrating an example of a portion of the display panel included in the display device of FIG. 8. FIG. 12 is a waveform diagram illustrating an example of signals supplied to the display panel of FIG. 11.

The display panel and driving thereof according to FIGS. 11 and 12 are substantially identical to those according to FIGS. 9 and 10, except a pixel arrangement having a stripe structure. Therefore, components identical or corresponding to those of FIGS. 2 and 4 are designated by like reference numerals, and overlapping descriptions will be omitted.

Referring to FIGS. 11 and 12, the pixels P1, P2, and P3 in the display panel 100 may be arranged in a stripe structure. For example, an arrangement of a second pixel R, a first pixel G, and a third pixel B is repeated in a pixel row. The first pixel G may emit green light, the second pixel R may emit red light, and the third pixel B may emit blue light.

In an ith pixel row, the first to third pixels P1, P2, and P3 commonly receive a first scan signal S1[i]. The second pixel P2 may include a switching transistor T0 controlled by a second scan signal S2[i]. The third pixel P3 may include a switching transistor T0 controlled by a third scan signal S3[i]. In an embodiment, the first scan signal S1[i] may have a first width CT1, the second scan signal S2[i] may have a second width CT2 smaller than the first width CT1, and the third scan signal S3[i] may have a third width CT3 smaller than the second width CT2.

The data divider 500 may selectively provide (time-divisionally supply) data voltages G, R, B to data lines in response to a first selection signal CLA for selecting the data line coupled to the first pixel G, a second selection signal CLB for selecting the data line coupled to the second pixel R, and a third selection signal CLC for selecting the data line coupled to the third pixel B.

At least a portion of an enabling period of the first scan signal S1[i] may overlap with at least a portion of an enabling period of the first selection signal CLA and the second and third selection signals CLB and CLC. At least a portion of an enabling period of the second scan signal S2[i] may overlap with at least a portion of an enabling period of the second selection signal CLB and the third selection signal CLC. At least a portion of an enabling period of the third scan signal S3[i] may overlap with at least a portion of an enabling period of the third selection signal CLC.

The threshold voltage compensation period of the first pixel P1 may correspond to a gate-on period of the first scan signal S1[i], i.e., the first width CT1. The threshold voltage compensation period of the second pixel P2 may correspond to a gate-on period of the second scan signal S2[i], i.e., the second width CT2. The threshold voltage compensation period of the third pixel P3 may correspond to a gate-on period of the third scan signal S3 [i], i.e., the third width CT3.

Accordingly, in the display device in which a data line demultiplexer having a stripe structure is driven according to the embodiment of the present disclosure, the threshold voltage compensation time of the first pixel G can be increased, and the threshold voltage compensation time of each of the second pixel R and the third pixel B can be freely controlled. Thus, an afterimage due to an insufficient compensation time and an image quality defect caused by a stain can be considerably prevented.

The present disclosure can be applied to electronic devices including display devices. For example, the present disclosure can be applied HMD devices, TVs, digital TVs, 3D TVs, household electronic devices, notebook computers, tablet computers, mobile phones, smartphones, PDAs, PMPs, digital cameras, music players, portable game consoles, navigation devices, wearable display devices, and the like.

According to the present disclosure, the display device includes a switching transistor for controlling the data voltage writing and threshold voltage compensation time of specific pixels in a horizontal period and a second scan signal and/or a third scan signal, so that the threshold voltage compensation time of all pixels in driving of a data line demultiplexer can be sufficiently ensured. Thus, an afterimage due to an insufficient compensation time caused by the driving of the data line demultiplexer and an image quality defect caused by a stain can be considerably prevented.

Further, the width, interval, etc. of the second scan signal and/or the third scan signal is controlled, so that the threshold voltage compensation time of a pixel applied with the second or third scan signal can be freely controlled.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a display panel including a first pixel, a second pixel adjacent to one side of the first pixel in a first direction, and a third pixel adjacent to the other side of the first pixel in the first direction;

a first scan driver supplying a first scan signal to switching transistor of the first to third pixels through a first scan line, each of the switching transistors being connected to a corresponding data line, respectively;

a second scan driver supplying a second scan signal to the second pixel through a second scan line when a first time elapses after the supply of the first scan signal is started, the second scan driver not supplying the second scan signal to the first pixel and the third pixel;

a third scan driver supplying a third scan signal to the third pixel through a third scan line after a second time elapses after the supply of the second scan signal is started, the third scan driver not supplying the third scan signal to the first pixel and the second pixel;

a data driver supplying data voltages to a plurality of output lines;

an emission driver supplying an emission control signal to the first to third pixels through an emission control line; and a data divider selectively supplying the data voltages to data lines respectively coupled to the first to third pixels.

2. The display device of claim 1, wherein the first scan signal has a first width, the second scan signal has a second width smaller than the first width, and the third scan signal has a third width smaller than the second width.

3. The display device of claim 2, wherein the data divider selectively supplies the data voltages to the data lines in response to a first selection signal for selecting a data line coupled to the first pixel and a second selection signal for selecting a data line coupled to at least one of the second pixel and the third pixel.

4. The display device of claim 3, wherein at least a portion of an enabling period of the first scan signal overlaps with at least a portion of an enabling period of the first selection signal and the second selection signal, and wherein at least a portion of an enabling period of the second scan signal and at least a portion of an enabling period of the third scan signal overlap with at least a portion of an enabling period of the second selection signal.

5. The display device of claim 2, wherein the data divider selectively supplies the data voltages to the data lines in response to a first selection signal for selecting a data line coupled to the first pixel, a second selection signal for selecting a data line coupled to the second pixel, and a third selection signal for selecting the data line coupled to the third pixel.

6. The display device of claim 5, wherein at least a portion of an enabling period of the first scan signal overlaps with at least a portion of an enabling period of the first selection signal, the second selection signal, and the third selection signal, wherein at least a portion of the second scan signal overlaps with at least a portion of an enabling period of the second selection signal and the third selection signal, and wherein at least a portion of an enabling period of the third scan signal overlaps with at least a portion of the third selection signal.

7. A display device comprising:

a display panel including a first pixel, a second pixel adjacent to one side of the first pixel in a first direction, and a third pixel adjacent to the other side of the first pixel in the first direction;

a first scan driver configured to supply a first scan signal to the first to third pixels through a first scan line;

a second scan driver configured to supply a second scan signal to the second pixel through a second scan line when a first time elapses after the supply of the first scan signal is started;

a third scan driver configured to supply a third scan signal to the third pixel through a third scan line after a second time elapses after the supply of the second scan signal is started;

a data driver configured to supply data voltages to a plurality of output lines; and a data divider configured to selectively supply the data voltages corresponding to the first to third pixels to data lines respectively coupled to the first to third pixels, wherein the second pixel includes a first switching transistor controlled by the second scan signal, wherein the third pixel includes a second switching transistor controlled by the third scan signal, wherein each of the first switching transistor and the second switching transistor is coupled in series to a scan transistor controlled by the first scan signal, and transfers a data voltage to the scan transistor.

* * * * *